Feb. 18, 1958  H. WOLDENGA  2,823,550
GEARLESS SPEED REGULATOR
Filed March 9, 1956
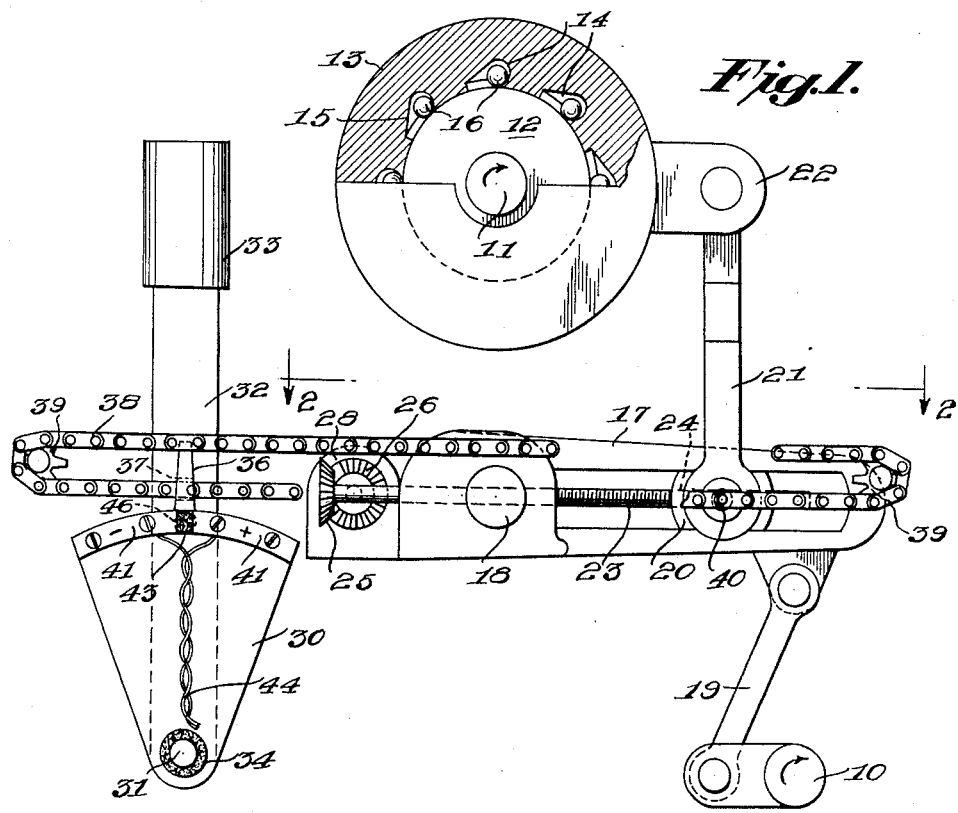
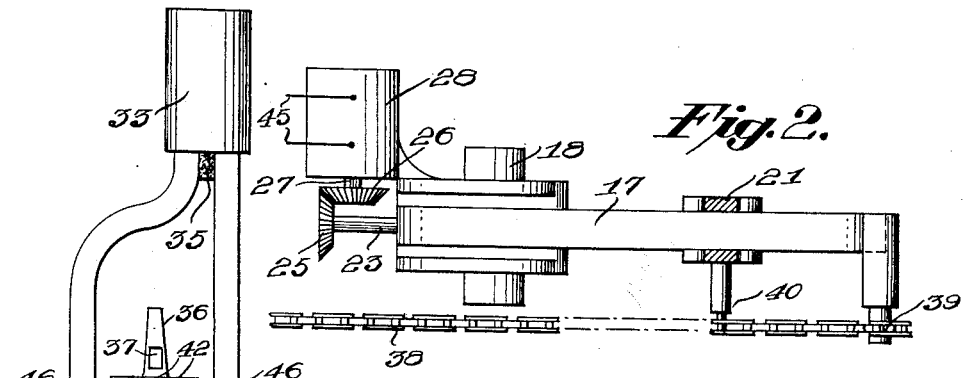
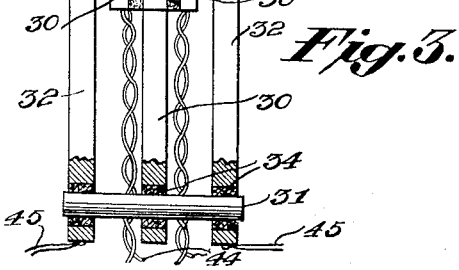
INVENTOR
Harry Woldenga.
BY
ATTORNEY United States Patent Office 2,823,550
Patented Feb. 18, 1958

2,823,550

GEARLESS SPEED REGULATOR

Harry Woldenga, Toronto, Ontario, Canada

Application March 9, 1956, Serial No. 570,571

4 Claims. (Cl. 74—119)

This invention relates to a gearless speed regulator.

The invention is more particularly concerned with apparatus for selectively controlling the speed of a second shaft which is driven by a constantly rotating first shaft of a prime mover.

Since it is desirable and in fact in many instances necessary to impart rotation to a driven shaft at a speed different from that of a driving shaft, various mechanisms have heretofore been provided for such purpose.

Such mechanisms have in most instances been in the form of variable size gears whereby the speed of rotation of a driven shaft may be different from that of a driving shaft.

Gearing, however, effects only a step speed adjustment whereas it is sometimes advantageous to effect continuous variable speed adjustment similar to the action of an electric motor and one which can be effected without disconnection of the drive between a prime mover and a driven member.

While mechanisms for this purpose have heretofore been proposed and possibly used, they were usually of rather complex construction and did not provide a satisfactory substitute for the old time change gear constructions.

It is accordingly an object of this invention to provide a speed regulator whereby the speed of a driven shaft is capable of progressive minute change from a minimum to a maximum while both the driving and driven shaft are in operation.

A further object of the invention is the provision of speed change means intermediate a drive shaft and a driven shaft and wherein such means is motor driven together with a movable speed indicating lever for setting the motor into operation in either direction and means operable for stopping the motor when a speed adjustment corresponding to said lever setting has been attained.

A further object of the invention is the provision of a speed regulator which is relatively simple in construction, durable in use, and which is highly efficient in operation.

Other objects and advantages of the invention will become apparent in the course of the following detailed description, taken in connection with the accompanying drawing, wherein—

Figure 1 is a side elevational view of the improved structure, partially broken away and in section.

Figure 2 is a fragmental horizontal sectional view of the structure as observed in the plane of line 2—2 on Figure 1.

Figure 3 is an end elevational view of the motor control means as observed from the left of Figure 1.

Referring now in detail to the drawing, 10 designates a drive shaft which extends from a constant speed motor and which rotates clockwise as indicated by the arrow.

A driven shaft is designated 11 and to which is rigidly secured a fly wheel 12.

The fly wheel 12 is provided with a relatively rotatable rim 13.

Interposed between the fly wheel 12 and the rim 13 is a one-way drive ball clutch device which includes a plurality of recesses 14 in the rim 13 and adjacent the cylindrical periphery of the fly wheel 12 and whose radial outer walls 15 converge toward the axis of shaft 11 and in a direction opposed to the active rotation of the rim 13.

A ball 16 is freely disposed in each recess 14 in bearing engagement with the periphery of the fly wheel 12.

From the above it will be apparent that upon increment rotation of the rim 13 counterclockwise, no rotation will be imparted to the fly wheel 12 since in such instance the balls 16 will only roll on the periphery of the fly wheel.

Upon clockwise rotation of the rim 13, however, the balls 16 will be frictionally wedged against the periphery of the fly wheel 12 by the outer recess walls 14 whereby the fly wheel will be rotated with the rim.

The above described structure provides a one-way clutch between the oscillatable rim 13 and the fly wheel 12, whereby the rim has an idle anti-clockwise movement and an active clockwise movement for step rotation of shaft 11 in a clockwise direction similarly to the shaft 10.

The rim 13 is rapidly oscillated through constant rotation of the drive shaft 10 by the following described means.

A lever 17 has one end thereof oscillatably supported on a stub-shaft 18. A lever 19 interconnects the drive shaft 10 with the opposite end of the lever 17 for oscillation thereof about the stub-shaft 18.

A crosshead 20 is disposed within the lever 17 for adjustable movement lengthwise thereof and the crosshead is pivotally engaged by one end of a connecting bar or rod 21 whose opposite end is pivotally connected to and between a pair of ears 22 projecting axially from the periphery of the rim 13.

As is obvious points in said lever 17 at consecutively greater distances from the stub-shaft 18 will move through correspondingly greater arcs and accordingly the connecting rod 21 will move through greater distances as the crosshead 20 is moved to positions at correspondingly greater distances from the stub-shaft 18 and when the axis of the crosshead 20 is aligned with the axis of the stub-shaft 18, no movement will be imparted to the connecting rod 21 upon oscillation of the lever 17.

Accordingly, means are provided for selectively positioning the crosshead 20 at variable distances from the stub-shaft 18 depending upon the desired speed ratio between the driven shaft 11 and the driving shaft 10.

Such means preferably comprises a relatively long screw 23 disposed within lever 17 and extending longitudinally thereof and which extends through a tapped bore 24 in the crosshead 20, the screw being suitably journaled adjacent one end thereof to retain same against axial movement upon rotation thereof.

It will, of course, be apparent that upon rotation of the screw 23 the crosshead will be moved toward or away from the stub-shaft 18 with a corresponding change in the movement of the connecting rod 21 and accordingly the oscillatory movement of the rim 13.

The screw 23 may be rotated by different means.

As shown, the rear end of the screw is provided with a bevel gear 25 which is in driving mesh with a pinion 26 on the end of the armature shaft 27 of a reversible electric motor 28 which is controlled by the following means.

A segment 30 is supported for free rotation on a shaft 31 which may be suitably supported adjacent the structure above described.

Also oscillatably supported on the shaft 31 are a pair of handle shanks 32 whose outer ends are engaged by a suitable hand grip 33.

As indicated in Fig. 3, the segment 30 and the handle shanks 32 are insulated from the shaft 31 by means of fiber bearings 34. Furthermore, the outer ends of the shanks 32 are insulated from each other as at 35 and the hand grip 33 may be of insulating material.

The segment 30 is provided with an upward projection 36 which is preferably upwardly tapered as shown and which adjacent its base is provided with an aperture 37.

A chain 38 extends about freely rotatable sprocket wheels 39, one of which is supported by lever 17. As indicated in Figure 1, the upper run of the chain is engaged with the upper end of the projection 36 whereas the lower run of the chain extends through the aperture 37 and is fixed to the connecting rod 21 as is indicated at 40.

Thus, the chain 38 will transmit movement of the crosshead 20 to the segment 30.

A pair of contact bars 41 are secured to segment 30 adjacent the periphery thereof and same are insulated from the segment as indicated at 42. Furthermore, the contact bars 41 of each pair thereof are insulated from each other as indicated at 43.

The contact bars 41 are connected to a power source by means of leads 44 and the handle shanks are connected to motor 28 by means of leads 45.

The handle shanks 32 are provided with contacts 46 which upon movement of the handle move along the contact bars 41.

In the drawing the contacts are shown on the insulation 43 intermediate the contacts and in which position the motor 28 is idle.

The motor will be set into operation upon movement of the handle such that the contacts 46 engage either the negative or positive contact bars 41 and the direction of rotation of the armature shaft 27 will be governed thereby.

When it is desired to change the setting of the crosshead 20 the handle is moved such that contacts 46 engage either the positive or negative contact bars 41 depending upon whether the crosshead is to be moved inwardly or outwardly.

Upon such position of the handle, the motor 28 will be set into operation and the crosshead 20 will be moved along lever 17 and due to the connection 40 with the chain, the latter will also move and such movement of the chain will cause rotation of the segment 30 in the same direction in which the handle has been adjusted and the segment will rotate until the contacts 46 again engage the insulated spaces between the contact bars when the motor will stop.

The screw 23 may, however, have a flexible shaft connected thereto and upon rotation of which the screw will be correspondingly rotated about its axis.

The thread on the screw 23 may be of any desired pitch, the smaller the pitch the greater will be the delicacy of adjustment.

Having set forth my invention in accordance with certain specific structural embodiments thereof, what I claim and desire to secure by U. S. Letters Patent is:

1. In a means for varying the speed of rotation of a secondary shaft driven by a constantly rotating primary shaft, comprising a one-way drive clutch operatively associated with said secondary shaft, a lever pivotally supported adjacent one end for oscillation thereof, means connecting said lever with said primary shaft for uniform oscillation thereof, a crosshead supported by said lever for adjustment toward or from the pivot thereof, and a drive connection between said crosshead and said clutch; the improvement which comprises a screw extending longitudinally of said lever and maintained thereby against axial movement, a threaded connection between said screw and said crosshead, a reversible motor having a constant driving connection with said screw, and manually operable control means for said motor including a segment pivoted on an axis and having spaced contact bars thereon, lead connections between said bars and a source of electric power, a speed variation setting handle movable about said axis and having lead connections to said motor, contacts on said handle engageable with said plates for setting the motor into operation for movement of said crosshead, and a drive connection between said crosshead and said segment for moving the latter on its axis in the direction of setting movement of said handle whereby upon resulting positioning of said contacts between said contact bars, the motor stops.

2. The structure according to claim 1, wherein one end of said screw is provided with a bevel gear, said motor being supported by said lever and having an armature shaft disposed at right angles to the screw, and a pinion on the free end of said armature shaft in constant mesh with said bevel gear.

3. The structure according to claim 1, wherein said drive connection comprises an endless sprocket chain, a connection between said chain and said crosshead, and a connection between said segment and said chain.

4. The structure according to claim 3, wherein said segment is provided with a projection having an opening through which one reach of said chain extends, and said connection between said segment and said chain being effected by projection on said segment extending into a link of the other reach of the chain.

References Cited in the file of this patent
UNITED STATES PATENTS

| | | |
|---|---|---|
| 982,666 | Girin | Jan. 24, 1911 |
| 1,045,582 | Messer | Nov. 26, 1912 |
| 1,674,143 | Stroud et al. | June 19, 1928 |
| 2,534,093 | Willard | Dec. 12, 1950 |
| 2,668,263 | Bennett | Feb. 2, 1954 |
| 2,717,344 | Jackson | Sept. 6, 1955 |